(12) United States Patent
Mukherjee et al.

(10) Patent No.: US 9,405,702 B2
(45) Date of Patent: Aug. 2, 2016

(54) CACHING TLB TRANSLATIONS USING A UNIFIED PAGE TABLE WALKER CACHE

(71) Applicant: Cavium, Inc., San Jose, CA (US)

(72) Inventors: Shubhendu Sekhar Mukherjee, Southborough, MA (US); Mike Bertone, Marlborough, MA (US); Albert Ma, Belmont, MA (US)

(73) Assignee: Cavium, Inc., San Jose, CA (US)

( * ) Notice: Subject to any disclaimer, the term of this patent is extended or adjusted under 35 U.S.C. 154(b) by 74 days.

(21) Appl. No.: 14/541,616

(22) Filed: Nov. 14, 2014

(65) Prior Publication Data

US 2016/0140048 A1    May 19, 2016

(51) Int. Cl.
*G06F 12/10*    (2016.01)
*G06F 12/08*    (2016.01)
*G06F 12/12*    (2016.01)

(52) U.S. Cl.
CPC ........ *G06F 12/1027* (2013.01); *G06F 12/0833* (2013.01); *G06F 12/1009* (2013.01); *G06F 12/128* (2013.01); *G06F 2212/62* (2013.01); *G06F 2212/657* (2013.01); *G06F 2212/68* (2013.01); *G06F 2212/683* (2013.01); *G06F 2212/69* (2013.01)

(58) Field of Classification Search
None
See application file for complete search history.

(56) References Cited

U.S. PATENT DOCUMENTS

2013/0326143 A1    12/2013    Chen

OTHER PUBLICATIONS

Ahn et al., "Revisiting Hardware-Assisted Page Walks for Virtualized Systems", Appears in the 39th International Symposium on Computer Architecture (ISCA 2012).
Barr et al., Translation Caching: Skip, Don't Walk (The Page Table), ISCA'10, Jun. 19-23, 2010, Saint-Malo, France.
Bhargava et al., "Accelerating Two-Dimensional Page Walks for Virtualized Systems", ASPLOS'08—Mar. 1-5, 2008, Seattle Washington, USA.

*Primary Examiner* — Kevin Verbrugge
(74) *Attorney, Agent, or Firm* — Occhiuti & Rohlicek LLP

(57) ABSTRACT

A core executes memory instructions. A memory management unit (MMU) coupled to the core includes a first cache that stores a plurality of final mappings of a hierarchical page table, a page table walker that traverses levels of the page table to provide intermediate results associated with respective levels for determining the final mappings, and a second cache that stores a limited number of intermediate results provided by the page table walker. The MMU compares a portion of the first virtual address to portions of entries in the second cache, in response to a request from the core to invalidate a first virtual address, based on a match criterion that depends on the level associated with each intermediate result stored in an entry in the second cache, and removes any entries in the second cache that satisfy the match criterion.

24 Claims, 6 Drawing Sheets

| Walker Cache | | |
|---|---|---|
| Table Level | VA | IPA |
| $L_1$ | $VA_A<47:39>$ | $IPA_{L1A}$ |
| $L_1$ | $VA_B<47:39>$ | $IPA_{L1B}$ |
| $L_2$ | $VA_C<47:30>$ | $IPA_{L2C}$ |
| $L_2$ | $VA_A<47:30>$ | $IPA_{L2A}$ |
| $L_2$ | $VA_E<47:30>$ | $IPA_{L2E}$ |
| $L_3$ | $VA_F<47:30>$ | $IPA_{L3F}$ |
| $L_3$ | $VA_G<47:21>$ | $IPA_{L3G}$ |
| $L_3$ | $VA_H<47:21>$ | $IPA_{L3H}$ |
| $L_3$ | $VA_A<47:21>$ | $IPA_{L3A}$ |
| ... | ... | ... |

| Walker Cache | | |
|---|---|---|
| Table Level | VA | IPA |
| L₁ | VA_A<47:39> | IPA_L1A |
| L₁ | VA_B<47:39> | IPA_L1B |
| L₂ | VA_C<47:30> | IPA_L2C |
| L₂ | VA_A<47:30> | IPA_L2A |
| L₂ | VA_E<47:30> | IPA_L2E |
| L₃ | VA_F<47:30> | IPA_L3F |
| L₃ | VA_G<47:21> | IPA_L3G |
| L₃ | VA_H<47:21> | IPA_L3H |
| L₃ | VA_A<47:21> | IPA_L3A |
| ... | ... | ... |

CACHING TLB TRANSLATIONS USING A UNIFIED PAGE TABLE WALKER CACHE

BACKGROUND

This invention relates to management of memory address translation in computing systems.

Many computing systems utilize virtual memory systems to allow programmers to access memory addresses without having to account for where the memory addresses reside in the physical memory hierarchies of the computing systems. To do so, virtual memory systems maintain a mapping of virtual memory addresses, which are used by the programmer, to physical memory addresses that store the actual data referenced by the virtual memory addresses. The physical memory addresses can reside in any type of storage device (e.g., SRAM, DRAM, magnetic disk, etc.).

When a program accesses a virtual memory address, the virtual memory system performs an address translation to determine which physical memory address is referenced by the virtual memory address. The data stored at the determined physical memory address is read from the physical memory address, as an offset within a memory page, and returned for use by the program. The virtual-to-physical address mappings are stored in a "page table." In some cases, the virtual memory address be located in a page of a large virtual address space that translates to a page of physical memory that is not currently resident in main memory (i.e., a page fault), so that page is then copied into main memory.

Modern computing systems include one or more translation lookaside buffers (TLBs) which are caches for the page table, used by the virtual memory system to improve the speed of virtual to physical memory address translation. Very generally, a TLB includes a number of entries from the page table, each entry including a mapping from a virtual address to a physical address. In general, the entries of the TLB cover only a portion of the total memory available to the computing system. In some examples, the entries of the TLB are maintained such that the portion of the total available memory covered by the TLB includes the most recently accessed, most commonly accessed, or most likely to be accessed portion of the total available memory. In general, the entries of a TLB need to be managed whenever the virtual memory system changes the mappings between virtual memory addresses and physical memory addresses.

SUMMARY

In one aspect, in general, an apparatus includes: a core configured to execute memory instructions that access data stored in physical memory based on virtual addresses translated to physical addresses based on a hierarchical page table having multiple levels that each store different intermediate results for determining final mappings between virtual addresses and a physical addresses; and a memory management unit (MMU) coupled to the core, the MMU including a first cache that stores a plurality of the final mappings of the page table, a page table walker that traverses the levels of the page table to provide intermediate results associated with respective levels for determining the final mappings, and a second cache that stores a limited number of intermediate results provided by the page table walker; wherein the MMU is configured to compare a portion of the first virtual address to portions of entries in the second cache, in response to a request from the core to invalidate a first virtual address; wherein the comparison is based on a match criterion that depends on the level associated with each intermediate result stored in an entry in the second cache; and wherein the MMU is configured to remove any entries in the second cache that satisfy the match criterion.

Aspects can include one or more of the following features.

The portion of an entry in the second cache that is compared with the portion of the first virtual address is a consecutive sequence of bits of a virtual address associated with an intermediate result stored in the entry.

The comparison is based on a match criterion that depends on the level associated with each intermediate result stored in an entry in the second cache, and depends on a granule size of a page containing the virtual address associated with the intermediate result.

The comparison comprises applying a bit mask to the entry in the second cache to determine the portion of the entry in the second cache, and applying a bit mask to the first virtual address to determine the portion of the first virtual address.

The mask is computed in response to the request from the core to invalidate a first virtual address.

The mask is stored in the entry in the second cache.

The second cache includes entries that store intermediate results associated with multiple different levels of the page table.

The first cache comprises a translation lookaside buffer that stores a subset consisting of fewer than all of the final mappings of the hierarchical page table.

The apparatus further includes a physical memory interface configured to access a first portion of the physical memory storing data referenced by physical addresses of a physical address space, and a second portion storing at least one level of the hierarchical page table.

The apparatus further includes a storage device storing data referenced by virtual addresses of a virtual address space.

A first subset of the entries in the second cache are associated with a first level of the multiple levels of the of the hierarchical page table, a second subset of the entries in the second cache are associated with a second level of the multiple levels of the hierarchical page table, and the comparison of a portion of the first virtual address to the entries in the first subset is performed in parallel to the comparison of a portion of the first virtual address to the entries in the second subset.

The comparison of a portion of the first virtual address to portions of entries in the second cache takes 3 processor cycles.

In another aspect, in general, a method includes: executing, in a core, memory instructions that access data stored in physical memory based on virtual addresses translated to physical addresses based on a hierarchical page table having multiple levels that each store different intermediate results for determining final mappings between virtual addresses and a physical addresses; and managing, in a memory management unit (MMU) coupled to the core, a first cache that stores a plurality of the final mappings of the page table, a page table walker that traverses the levels of the page table to provide intermediate results associated with respective levels for determining the final mappings, and a second cache that stores a limited number of intermediate results provided by the page table walker; wherein the MMU compares a portion of the first virtual address to portions of entries in the second cache, in response to a request from the core to invalidate a first virtual address; wherein the comparison is based on a match criterion that depends on the level associated with each intermediate result stored in an entry in the second cache; and wherein the MMU removes any entries in the second cache that satisfy the match criterion.

Aspects can include one or more of the following features.

The portion of an entry in the second cache that is compared with the portion of the first virtual address is a consecutive sequence of bits of a virtual address associated with an intermediate result stored in the entry.

The comparison is based on a match criterion that depends on the level associated with each intermediate result stored in an entry in the second cache, and depends on a granule size of a page containing the virtual address associated with the intermediate result.

The comparison comprises applying a bit mask to the entry in the second cache to determine the portion of the entry in the second cache, and applying a bit mask to the first virtual address to determine the portion of the first virtual address.

The mask is computed in response to the request from the core to invalidate a first virtual address.

The mask is stored in the entry in the second cache.

The second cache includes entries that store intermediate results associated with multiple different levels of the page table.

The first cache comprises a translation lookaside buffer that stores a subset consisting of fewer than all of the final mappings of the hierarchical page table.

The method further includes a physical memory interface configured to access a first portion of the physical memory storing data referenced by physical addresses of a physical address space, and a second portion storing at least one level of the hierarchical page table.

The method further includes a storage device storing data referenced by virtual addresses of a virtual address space.

A first subset of the entries in the second cache are associated with a first level of the multiple levels of the of the hierarchical page table, a second subset of the entries in the second cache are associated with a second level of the multiple levels of the hierarchical page table, and the comparison of a portion of the first virtual address to the entries in the first subset is performed in parallel to the comparison of a portion of the first virtual address to the entries in the second subset.

The comparison of a portion of the first virtual address to portions of entries in the second cache takes 3 processor cycles.

Aspects can have one or more of the following advantages.

Among other advantages, aspects include a single, unified walker cache including entries for a number of page table levels. This advantageously allows for dynamic allocation of entries to the different page table levels, without placing unnecessary restrictions on the number of entries that are allocated to each page table level (as is done in some conventional approaches).

Translation management of entries in the walker cache is seamlessly handled using a TLB invalidation instruction.

Other features and advantages of the invention will become apparent from the following description, and from the claims.

DESCRIPTION OF DRAWINGS

FIG. 4 is a walker cache.

FIG. 6 illustrates walker cache entry invalidation.

DESCRIPTION

1 Overview

Walking multi-level page tables in response to a translation lookaside buffer miss can consume an undesirably long amount of time. Approaches described herein cache intermediate page addresses during page table walks and use the cached intermediate page addresses to increase the speed of future walks. Approaches also efficiently manage translation changes in the cache of intermediate page addresses.

2 Computing System

Figure 1:
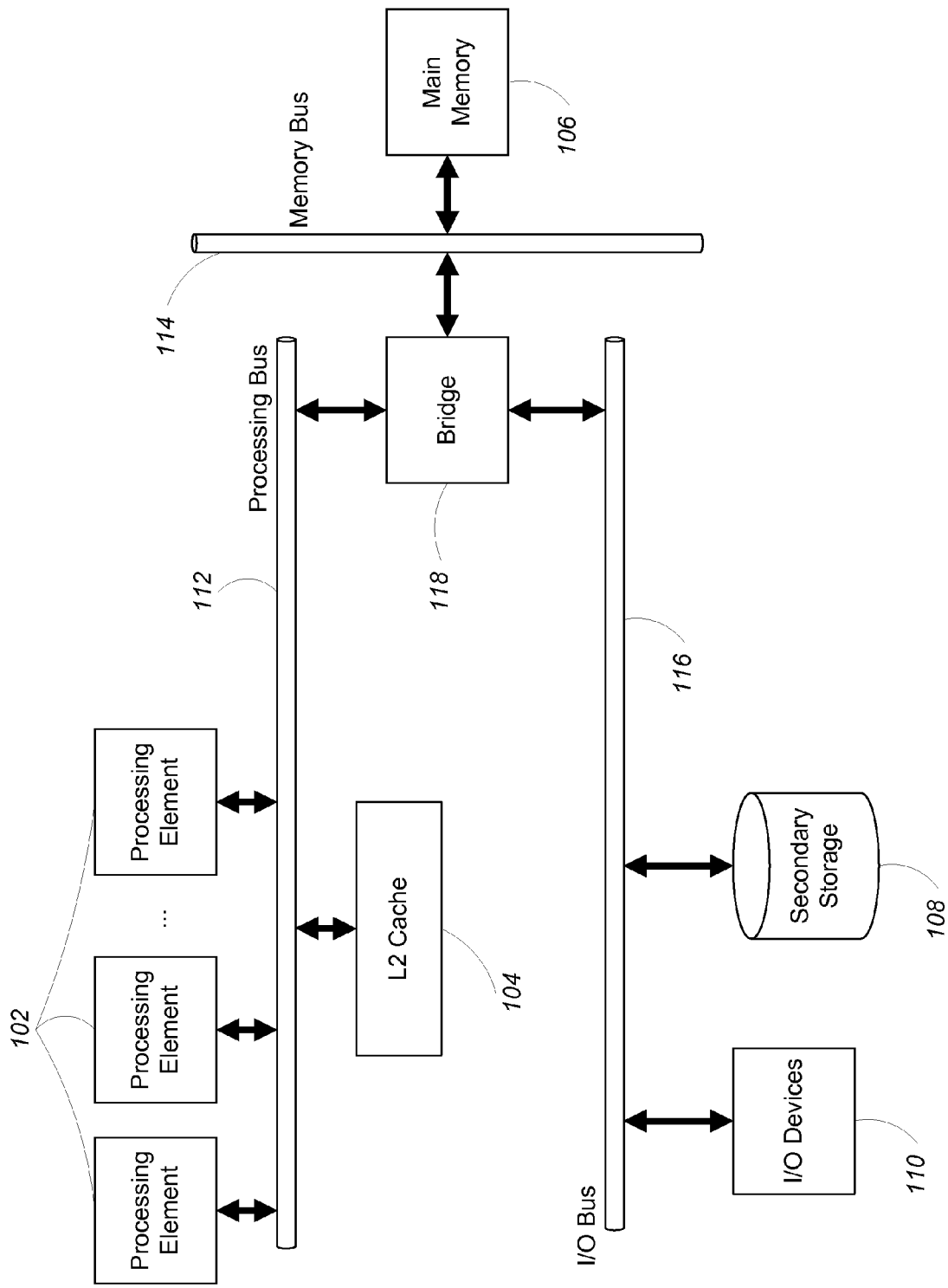
FIG. 1 is a computing system.

Referring to FIG. 1, a computing system 100 includes a number of processing elements 102, a level 2 (L2) cache 104 (e.g., SRAM), a main memory 106 (e.g., DRAM), a secondary storage device (e.g., a magnetic disk) 108, and one or more input/output (I/O) devices 110 (e.g., a keyboard or a mouse). The processing elements 102 and the L2 cache 104 are connected to a processor bus 112, the main memory 106 is connected to a memory bus 114, and the I/O devices 110 and the secondary storage device 108 are connected to an I/O bus 116. The processor bus 112, the memory bus 114, and the I/O bus 116 are connected to one another via a bridge 118.

2.1 Memory Hierarchy

In general, the processing elements 102 execute instructions of one or more computer programs, including reading processor instructions and data from memory included in the computing system 100. As is well known in the art, the various memory or storage devices in the computing system 100 are organized into a memory hierarchy based on a relative latency of the memory or storage devices. One example of such a memory hierarchy has processor registers (not shown) at the top, followed by a level 1 (L1) cache (not shown), followed by the L2 cache 104, followed by the main memory 106, and finally followed by the secondary storage 108. When a given processing element 102 tries to access a memory address, each memory or storage device in the memory hierarchy is checked, in order from the top of the memory hierarchy down, to determine whether the data for the memory address is stored in the storage device or memory device.

For example, for a first processing element of the processing elements 102 to access a memory address for data stored only in the secondary storage device 108, the processing element first determines whether the memory address and data are stored in its L1 cache. Since the memory address and data are not stored in its L1 cache, a cache miss occurs, causing the processor to communicate with the L2 cache 140 via that processor bus 112 to determine whether the memory address and data are stored in the L2 cache 140. Since the memory address and data are not stored in the L2 cache, another cache miss occurs, causing the processor to communicate with the main memory 106 via the processor bus 112, bridge 110, and memory bus 118 to determine whether the memory address and data are stored in the main memory 106. Since the memory address and data are not stored in the main memory 106, another miss occurs (also called a "page fault"), causing the processor to communicate with the secondary storage device 108 via the processor bus, the bridge 118, and the I/O bus 116 to determine whether the memory address and data are stored in the secondary storage device 108. Since the memory address and data are stored in the secondary storage device 108, the data is retrieved from the secondary storage device 108 and is returned to the processing element via the I/O bus 116, the bridge 118, and the processor bus 112. The memory address and data maybe cached in any number of the memory or storage devices in the memory hierarchy such that it can be accessed more readily in the future.

2.2 Processing Elements

Figure 2:
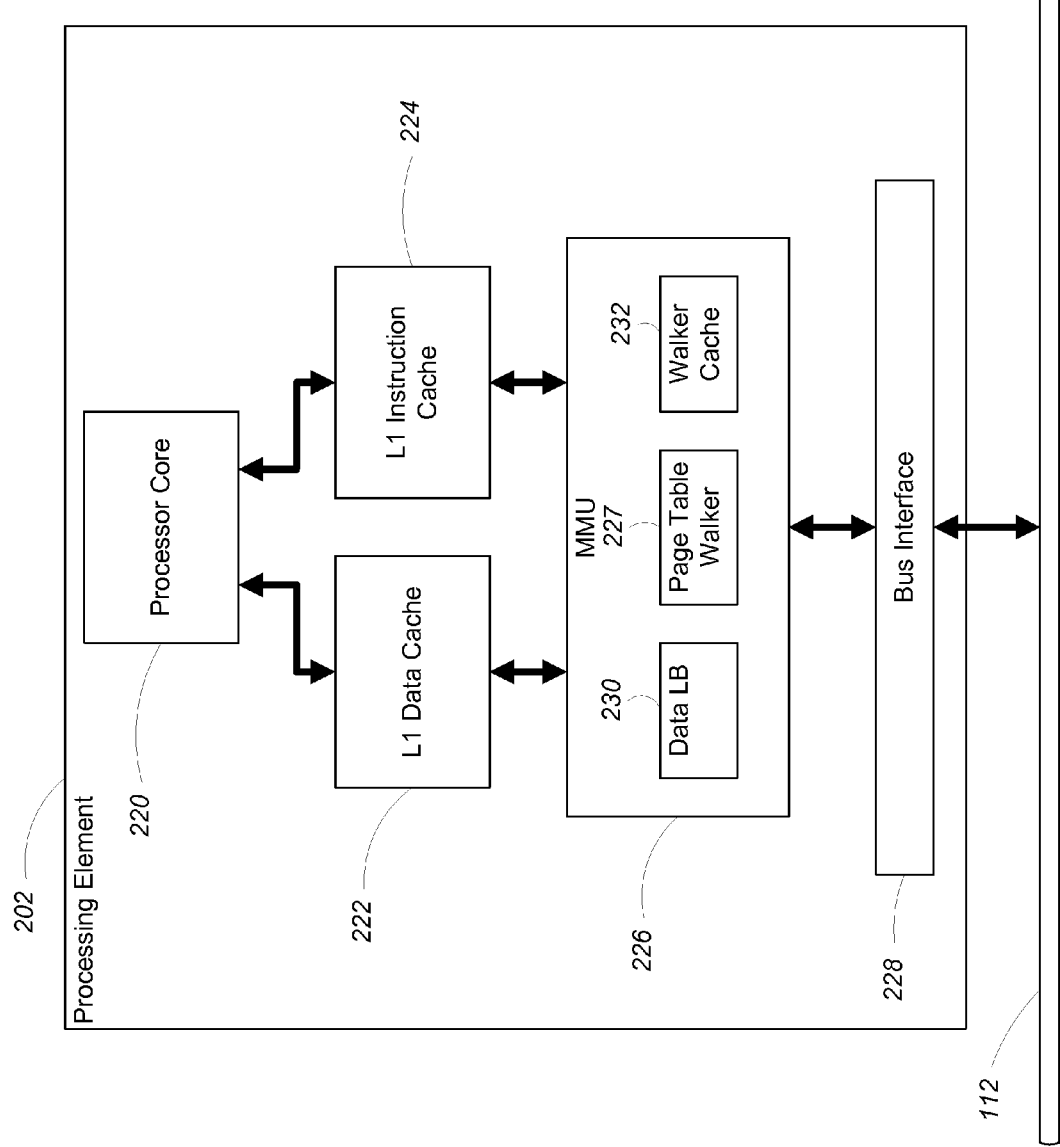
FIG. 2 is a processing element coupled to a processor bus.

Referring to FIG. 2, one example of a processing element 202 of the processing elements 102 of FIG. 1 is connected to the processor bus 112. The processing element 202 includes a processor core 220, an L1 data cache 222, an L1 instruction cache 224, a memory management unit (MMU) 226, and a bus interface 228. The processor core 220 (also called simply a "core") is an individual processor (also called a central processing unit (CPU)) that, together with other processor cores, coordinate to form a multi-core processor. The MMU 226 includes a page table walker 227, a walker cache 232, and a translation lookaside buffer (TLB) 230, each of which is described in more detail below.

2.2.1 Data Memory Access

When the processor core 220 requires access to a virtual memory address associated with data, the processor core 220 sends a memory access request for the virtual memory address to the L1 data cache 222. The L1 data cache 222 stores a limited number of recently or commonly used data values tagged by their virtual memory addresses. If the L1 data cache 222 has an entry for the virtual memory address (i.e., a cache hit), the data associated with the virtual memory address is returned to the processor core 220 without requiring any further memory access operations in the memory hierarchy. Alternatively, in some implementations, the L1 data cache 222 tags entries by their physical memory addresses, which requires address translation even for cache hits.

If the L1 data cache 222 does not have an entry for the virtual memory address (i.e., a cache miss), the memory access request is sent to the MMU 226. In general, the MMU 226 uses the TLB 230 to translate the virtual memory address to a corresponding physical memory address and sends a memory access request for the physical memory address out of the processor 202 to other elements of the memory hierarchy via the bus interface 228. The page table walker 227 handles retrieval of mappings that are not stored in the TLB 230, by accessing the full page table that is stored (potentially hierarchically) in one or more levels of memory. The page table stores a complete set of mappings between virtual memory addresses and physical memory addresses that the page table walker 227 accesses to translate the virtual memory address to a corresponding physical memory address.

To speed up the process of translating the virtual memory address to the physical memory address, the TLB 230 includes a number of recently or commonly used mappings between virtual memory addresses and physical memory addresses. If the TLB 230 has a mapping for the virtual memory address, a memory access request for the physical memory address associated with the virtual memory address (as determined from the mapping stored in the TLB 230) is sent out of the processor 202 via the bus interface 228.

If the TLB 230 does not have a mapping for the for the virtual memory address (i.e., a TLB miss), the page table walker 227 traverses (or "walks") the levels of the page table to determine the physical memory address associated with the virtual memory address, and a memory request for the physical memory address (as determined from the mapping stored in the page table) is sent out of the processor 202 via the bus interface 228. As is described in greater detail below, in some examples, the page table is implemented as a multi-level page table and the page table walker 227 uses the walker cache 232 to reduce the amount of time required to determine the physical memory address associated with the virtual memory address.

In some examples, the TLB 230 and the page table are accessed in parallel to ensure that no additional time penalty is incurred when a TLB miss occurs.

Since the L1 data cache 222 and the TLB 230 can only store limited number of entries, cache management algorithms are required to ensure that the entries stored in the L1 data cache 222 and the TLB 230 are those that are likely to be re-used multiple times. Such algorithms evict and replace entries stored in the L1 data cache 222 and the TLB 230 based on a criteria such as a least recently used criteria.

2.2.2 Instruction Memory Access

When the processor core 220 requires access to a virtual memory address associated with processor instructions, the processor core 220 sends a memory access request for the virtual memory address to the L1 instruction cache 224. The L1 instruction cache 224 stores a limited number of processor instructions tagged by their virtual memory addresses. If the L1 instruction cache 224 has an entry for the virtual memory address (i.e., a cache hit), the processor instruction associated with the virtual memory address is returned to the processor core 220 without requiring any further memory access operations in the memory hierarchy. Alternatively, in some implementations, the L1 instruction cache 224 tags entries by their physical memory addresses, which requires address translation even for cache hits.

However, if the L1 instruction cache 224 does not have an entry for the virtual memory address (i.e., a cache miss), the memory access request is sent to the MMU 226. In general, the MMU 226 uses the instruction TLB to translate the virtual memory address to a corresponding physical memory address and sends a memory access request for the physical memory address out of the processor 202 to other elements of the memory hierarchy via the bus interface 228. As is noted above, this translation is accomplished using the page table walker 227, which handles retrieval of mappings between virtual memory addresses and physical memory addresses from the page table.

To speed up the process of translating the virtual memory address to the physical memory address, the TLB 230 includes a number of recently or commonly used mappings between virtual memory addresses and physical memory addresses. If the TLB 230 has a mapping for the virtual memory address, a memory access request for the physical memory address associated with the virtual memory address (as determined from the mapping stored in the TLB 230) is sent out of the processor 202 via the bus interface 228.

If the TLB 230 does not have a mapping for the for the virtual memory address (i.e., a TLB miss), the page table walker 227 walks the page table to determine the physical memory address associated with the virtual memory address, and a memory request for the physical memory address (as determined from the mapping stored in the page table) is sent out of the processor 202 via the bus interface 228. As is described in greater detail below, in some examples, the page table is implemented as a multi-level page table and the page table walker 227 uses the walker cache 232 to reduce the amount of time required to determine the physical memory address associated with the virtual memory address.

In some examples, the TLB 230 and the page table are accessed in parallel to ensure that no additional time penalty is incurred when a TLB miss occurs.

Since the L1 instruction cache 224 and the TLB 230 can only store a limited number of entries, cache management algorithms are required to ensure that the mappings stored in the L1 instruction cache 224 and the TLB 230 are those that are likely to be re-used multiple times. Such algorithms evict and replace mappings stored in the L1 instruction cache 224 and the TLB 230 based on a criteria such as a least recently used criteria.

2.2.3 Page Table Walker

As is mentioned above, when TLB miss occurs for a virtual memory address, the page table walker 227 walks the page table to determine the physical memory address associated with the virtual memory address.

Figure 3:
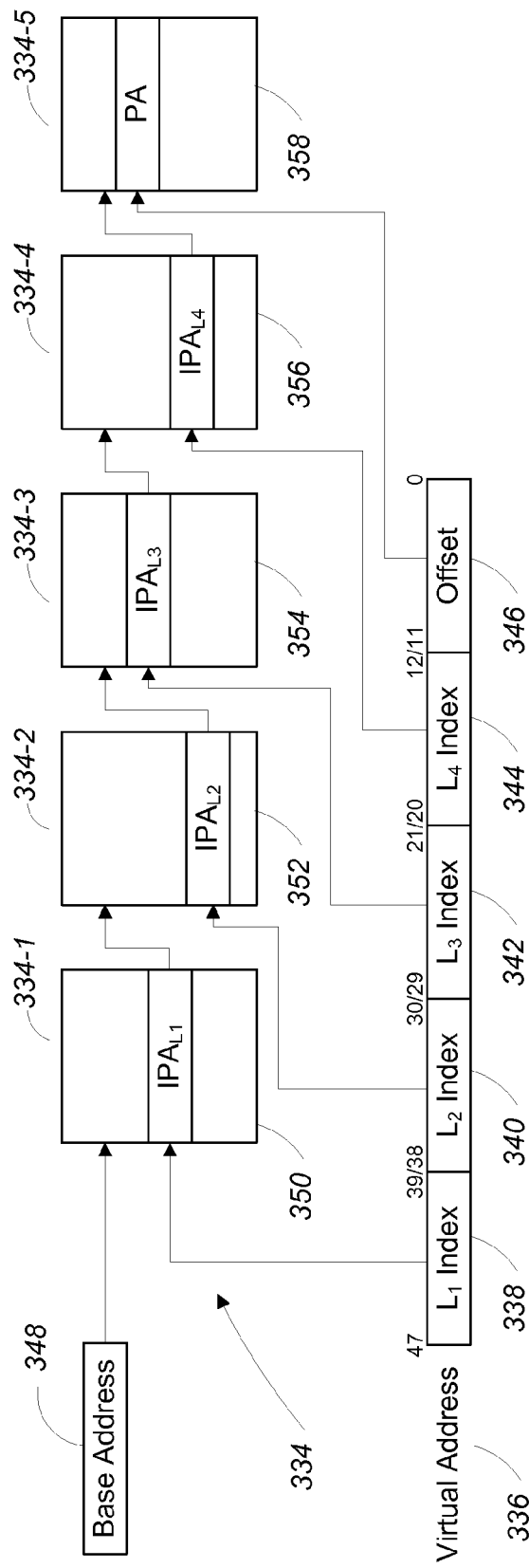
FIG. 3 illustrates a page table walk.

Referring to FIG. 3, a multi-level page table 334 includes a first page table level 334-1, a second page table level 334-2, a third page table level 334-3, a fourth page table level 334-4, and a fifth page table level 334-5. Each page table level can include a number of page tables. In general, each page table includes a number of entries, each including an intermediate physical page number. Each intermediate physical page number corresponds to a portion of the physical memory address associated with the virtual memory address and is used to address the appropriate page table in the next page table level. In some examples, the page table is decomposed using other decomposition schemes. In some examples, different page table structures are used.

When a TLB miss occurs for a virtual memory address 336, the page table walker 227 walks the multi-level page table 334 to determine the physical address associated with the virtual memory address 336.

To do so, the page table walker 227 first decomposes the virtual memory address 336 into a sequence of indices and an offset. In FIG. 3, the virtual memory address 336 is decomposed into a level 1 index 338 (e.g., bits 47:39 of the virtual memory address), a level 2 index 340 (e.g., bits 38:30 of the virtual memory address), a level 3 index 342 (e.g., bits 29:21 of the virtual memory address), a level 4 index 344 (e.g., bits 20:12 of the virtual memory address), and an offset 346 (e.g., bits 11-0 of the virtual memory address). The page table walker 227 then uses a base address 348 (which may be stored in a register of the processing element) to locate a corresponding level 1 page table 350 at the first page table level 334-1.

With the level 1 page table 350 located, the page table walker 227 indexes into the level 1 page table 350 using the level 1 index 338 to identify a page table entry corresponding to the level 1 index 338. The page table walker 227 extracts a level 1 intermediate page address, $IPA_{L1}$ from the indentified entry. $IPA_{L1}$ is used to locate a corresponding level 2 page table 352 at the second page table level 334-2.

With the level 2 page table 352 located, the page table walker 227 indexes into the level 2 page table 352 using the level 2 index 340 to identify a page table entry corresponding to the level 2 index 340. The page table walker 227 extracts a level 2 intermediate page address, $IPA_{L2}$ from the identified entry. $IPA_{L2}$ is used to locate a corresponding level 3 page table 354 at the third page table level 334-3.

With the level 3 page table 354 located, the page table walker 227 indexes into the level 3 page table 354 using the level 3 index 342 to identify a page table entry corresponding to the level 3 index 342. The page table walker 227 extracts a level 3 intermediate page address, $IPA_{L3}$ from the identified entry. $IPA_{L3}$ is used to locate a corresponding level 4 page table 356 at the fourth page table level 334-4.

With the level 4 page table 356 located, the page table walker 227 indexes into the level 4 page table 356 using the level 4 index 344 to identify a page table entry corresponding to the level 4 index 344. The page table walker 227 extracts a level 4 intermediate page address, $IPA_{L4}$ from the identified entry. $IPA_{L4}$ is used to locate a corresponding level 5 page table 358 at the fifth page table level 334-4.

With the level 5 page table 358 located, the page table walker 227 indexes into the level 5 page table 358 using the offset 346 to identify a page table entry corresponding to the offset 346. The page table walker 227 extracts a final portion of the physical address, $PA_{L5}$ from the identified entry.

After extracting the final portion of the physical memory address, $PA_{L5}$, from the identified entry, the translation of the virtual memory address 336 to the physical memory address is complete.

In some examples, the ranges of bits that are used to decompose the virtual memory address are different from those described above and can vary based on a variety of system configurations and based on the configuration of the multi-level page table.

2.2.3.1 Walker Cache

Referring to FIG. 4, in some examples, the page table walker 227 uses the walker cache 232 to increase the speed of virtual to physical memory address translation. Very generally, the walker cache 232 maintains a set of recently or commonly used intermediate translations (i.e., translations from a portion of a virtual memory address to an intermediate page address). In certain situations, using the walker cache 232 can shorten the walk required to determine a physical memory address by beginning the walk from one of the intermediate translations stored in the walker cache 232.

The walker cache 232 includes a number of entries 460 (represented as rows in FIG. 4). Each entry represents an intermediate translation and includes a table level value 462, a cached virtual memory address portion (VA) 464, and an intermediate page address (IPA) 466 corresponding to the cached virtual memory address portion 464.

For a given entry, the table level value 462 represents a level in the multi-level page table that is associated with the entry. In the example of FIG. 3, there are three possible table level values: 1, 2, 3, and 4. Note that page table level 5 is not included in the cache since the final page table level is essentially covered by the TLB 230. Furthermore, in some examples, intermediate translations for higher numbered table levels (e.g., level 4) are not cached since they are unlikely to be commonly used.

The cached virtual memory address portion 464 is a subset of a virtual memory address that is associated with the intermediate translation maintained by the entry 460. A number of bits in the cached virtual memory address portion 464 varies depending on the table level associated with the entry. In the example of FIG. 3, if the table level is 1, the cached virtual memory address portion 464 includes 9 bits (i.e., bits <47:39> of the virtual memory address. If the table level is 2, the cached virtual memory address portion 464 includes 18 bits (i.e., bits <47:30> of the virtual memory address). If the table level is 3, the cached virtual memory address portion 464 includes 27 bits (i.e., bits <47:21> of the virtual memory address).

The intermediate page address 466 includes a concatenation of one or more other intermediate page addresses associated with the cached virtual memory address portion 464. For example, for an entry with a table level value of 3, the intermediate page address 466 includes a concatenation of an intermediate page address determined from a level 1 page table, an intermediate page address determined from a level 2 page table, and an intermediate page address determined from a level 3 page table. In some examples, the intermediate page address 466 has the same number of bits as the cached virtual memory address portion 464. In general, the intermediate page address 466 represents a partially translated physical memory address.

2.2.3.1.1 Walker Cache Management

When the page table walker 227 walks a multi-level page table, the entries 460 of the walker cache 232 are updated to reflect the intermediate translations that are encountered. For example, when the page table walker 227 walks to level 2 of the page table for a virtual memory address $VA_E$, a walker cache entry including a table level value of '2,' a portion of the virtual memory address value of $VA_E$<47:30>, and an intermediate page address of $IPA_{L2E}$ corresponding to the portion of the virtual memory address are added to the walker cache 232.

In general, since the walker cache 232 includes a finite number of entries, cache management algorithms are used to ensure that the entries stored in the walker cache 232 are those that are likely to be re-used multiple times. Such algorithms evict and replace entries stored in the walker cache 232 based on criteria such as a least recently used criteria.

2.2.3.1.2 Walker Cache Usage

Once populated, the entries 460 of the walker cache 232 can be used by the page table walker 227 to quickly obtain an intermediate page address for a previously translated virtual memory address without having to walk the page table.

Figure 5:
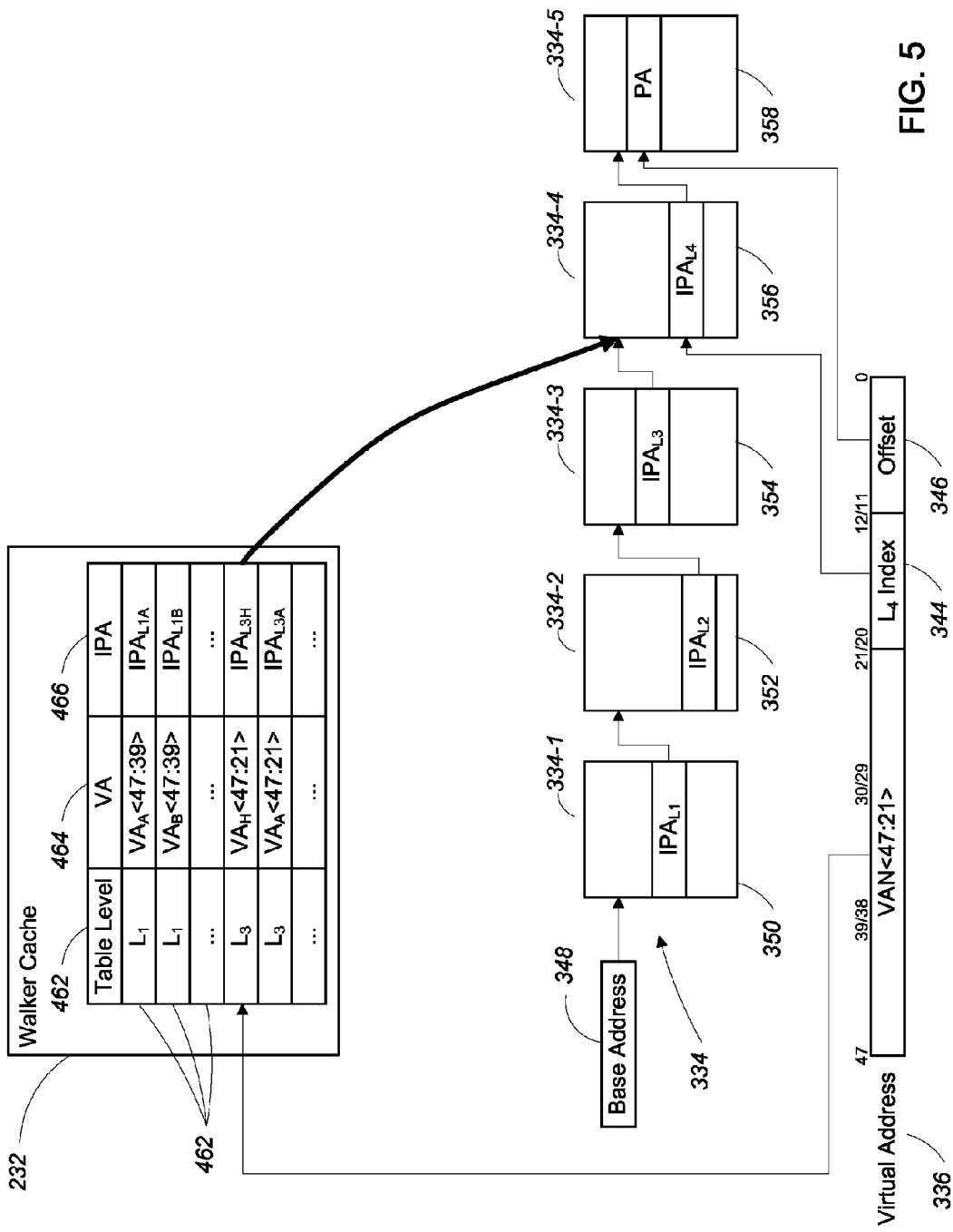
FIG. 5 illustrates a page table walk using a walker cache result.

Referring to the example of FIG. 4, to do so, when the page table walker 227 receives an input virtual memory address, $VA_N$ for translation, it first identifies a portion of $VA_N$ corresponding to the highest page table level (i.e., $L_3$) being cached by the walker cache 232. In this example, the portion of $VA_N$ corresponding to $L_3$ is $VA_N$<47:21>. Then, for each entry having a table level value 462 matching the highest table level value, $L_3$, the page table walker 227 compares $VA_N$<47:21> to the cached virtual memory address portion 464 of the entry. Referring to FIG. 5, If an entry with $VA_N$<47:21> matching the cached virtual memory address portion 464 (e.g., $VA_H$<47:21>) is found, then the page table walker 227 can begin its walk from the intermediate page address 466 (e.g., $IPA_{L3H}$) associated with the entry rather than from the beginning of the page table.

Referring again to FIG. 4, if no matching entry is found, the page table walker 227 identifies a portion of $VA_N$ corresponding to one page table level up in the hierarchy of the multi-level page table (i.e., $L_2$). In this example, the portion of $VA_N$ corresponding to $L_2$ is $VA_N$<47:30>. Then, for each entry in the walker cache 232 having a table level value 462 matching $L_2$, the page table walker 227 compares $VA_N$<47:30> to the cached virtual memory address portion 464 of the entry. If an entry with $VA_N$<47:30> matching the cached virtual memory address portion 464 (e.g., $VA_E$<47:30> is found, then the page table walker 227 can begin its walk from the intermediate page address 466 (e.g., $IPA_{L2E}$) associated with the entry.

If again, no matching entry is found, the page table walker 227 identifies a portion of $VA_N$ corresponding to another page table level up in the hierarchy of the multi-level page table (i.e., $L_1$). In this example, the portion of $VA_N$ corresponding to $L_1$ is $VA_N$<47:39>. Then, for each entry in the walker cache 232 having a table level value 462 matching $L_1$, the page table walker 227 compares $VA_N$<47:39> to the cached virtual memory address portion 464 of the entry. If an entry with $VA_N$<47:39> matching the cached virtual memory address portion 464 (e.g., $VA_A$<47:39> is found, then the page table walker 227 can begin its walk from the intermediate page address 466 (e.g., $IPA_{L1A}$) associated with the entry.

If again, no matching entry is found, then a full page table walk is required.

While not shown in FIG. 4, in some examples, the walker cache 232 includes entries for higher levels of the page table (e.g., level 4, $VA_X$<47:12>).

2.3 Translation Lookaside Buffer Invalidation (TLBI) Instructions

In some examples, the computing system's virtual memory system may change its mappings between virtual memory addresses and physical memory addresses. In such cases, translation lookaside buffer invalidation instructions (TLBIs) for the virtual memory addresses are issued (e.g., by an operating system or by a hardware entity) to the TLBs in the computing system (i.e., the TLB 230 and instruction TLB 232 of each processing element 202). In general, a TLBI instruction includes a virtual memory address and causes invalidation of any TLB entries associated with the virtual memory address. That is, when a TLB receives a TLBI for a given virtual memory address, any entries in the TLB storing mappings between the given virtual memory address and a physical memory address are invalidated.

2.3.1 Walker Cache Entry Invalidation

In some examples, when a TLBI instruction is issued for a virtual memory address, the TLBI instruction also causes entries in the walker cache that are associated with the virtual memory address to be invalidated.

Referring to FIG. 6, to do so, when a TLBI is issued for a virtual memory address, $VA_{TLBI}$, a portion of $VA_{TLBI}$ corresponding to the highest page table level (i.e., $L_3$) being cached by the walker cache 232 is identified. In this example, the portion of $VA_{TLBI}$ corresponding to $L_3$ is $VA_{TLBI}$<47:21>. Then, for each entry in the walker cache 232 having a table level value 462 matching the highest table level value, $L_3$, $VA_{TLBI}$<47:21> is compared to the cached virtual memory address portion 464 of the entry. If $VA_{TLBI}$<47:21> matches the cached virtual memory address portion 464 of an entry, the entry is invalidated (e.g., by deleting the entry or setting an invalid bit). For example, in FIG. 6, the comparison of $VA_{TLBI}$<47:21> to $VA_A$<47:21> results in a match, and the entry including $VA_A$<47:21> is invalidated.

Regardless of whether or not a matching entry is found in the entries of $L_3$, a portion of $VA_{TLBI}$ corresponding to one table level up in the hierarchy of the multi-level page table (i.e., $L_2$) is identified. In this example, the portion of $VA_{TLBI}$ corresponding to $L_2$ is $VA_{TLBI}$<47:30>. Then, for each entry in the walker cache 232 having a table level value 462 matching $L_2$, $VA_{TLBI}$<47:30> is compared to the cached virtual memory address portion 646 of the entry. If $VA_{TLBI}$<47:30> matches the cached virtual memory address portion 464 of an entry, the entry is invalidated (e.g., by deleting the entry or setting an invalid bit). For example, in FIG. 6, the comparison of $VA_{TLBI}$<47:30> to $VA_A$<47:30> results in a match, and the entry including $VA_A$<47:30> is invalidated.

Regardless of whether or not a matching entry is found in the entries of $L_3$, a portion of $VA_{TLBI}$ corresponding to one table level up in the hierarchy of the multi-level page table (i.e., $L_1$) is identified. In this example, the portion of $VA_{TLBI}$ corresponding to $L_1$ is $VA_{TLBI}$<47:39>. Then, for each entry in the walker cache 232 having a table level value 462 matching $L_1$, $VA_{TLBI}$<47:39> is compared to the cached virtual memory address portion 646 of the entry. If $VA_{TLBI}$<47:39> matches the cached virtual memory address portion 464 of an entry, the entry is invalidated (e.g., by deleting the entry or setting an invalid bit). For example, in FIG. 6, the comparison of $VA_{TLBI}$<47:39> to $VA_A$<47:39> results in a match, and the entry including $VA_A$<47:39> is invalidated.

3 Alternatives

In some examples, walker cache entries include other information such as a stage (virtual to intermediate or intermediate to physical), mask bits, and context identifiers.

In some examples, the page table walker 227 walks the page table at the same time that it queries the walker cache 232 to reduce incurring a time penalty if a walker cache miss occurs.

In some examples, rather than invalidating all walker cache entries associated with a virtual memory address in response to a TLBI instruction for the virtual memory address, walker cache entries associated with the virtual memory address are selectively invalidated based on a match criterion. For example, walker cache entries may be invalidated based on a table level value associated with the entry (e.g., all entries with table levels greater than 2 are invalidated). In some examples, the decision as to which walker cache entries are invalidated is based on a granularity of the page tables. For example, an architecture may specify a minimum granule size to be used as a unit of translation. In the example presented above, the minimum granule size is 4 KB. This would mean the address bits <11:0> would cover all the bytes addressed within the 4 KB granule. To address a granule, address bits <47:12> would be used. For a granule size of 64 KB, bits <47:16> would be used. Bigger sized blocks can be constructed out of those granules.

In some examples, the comparisons of ranges of bits are accomplished using bit masks.

In some examples a walker cache entry may include intermediate translations for a number of different page table levels.

Other embodiments are within the scope of the following claims.

What is claimed is:

1. An apparatus comprising:
   a core configured to execute memory instructions that access data stored in physical memory based on virtual addresses translated to physical addresses based on a hierarchical page table having multiple levels that each store different intermediate results for determining final mappings between virtual addresses and physical addresses; and
   a memory management unit (MMU) coupled to the core, the MMU including a first cache that stores a plurality of the final mappings of the page table, a page table walker that traverses the levels of the page table to provide intermediate results associated with respective levels for determining the final mappings, and a second cache that stores a limited number of intermediate results provided by the page table walker;
   wherein the MMU is configured to compare a portion of the first virtual address to portions of entries in the second cache, in response to a request from the core to invalidate a first virtual address;
   wherein the comparison is based on a match criterion that depends on the level associated with each intermediate result stored in an entry in the second cache; and
   wherein the MMU is configured to remove any entries in the second cache that satisfy the match criterion.

2. The apparatus of claim 1, wherein the portion of an entry in the second cache that is compared with the portion of the first virtual address is a consecutive sequence of bits of a virtual address associated with an intermediate result stored in the entry.

3. The apparatus of claim 2, wherein the comparison is based on a match criterion that depends on the level associated with each intermediate result stored in an entry in the second cache, and depends on a granule size of a page containing the virtual address associated with the intermediate result.

4. The apparatus of claim 2, wherein the comparison comprises applying a bit mask to the entry in the second cache to determine the portion of the entry in the second cache, and applying a bit mask to the first virtual address to determine the portion of the first virtual address.

5. The apparatus of claim 4, wherein the mask is computed in response to the request from the core to invalidate a first virtual address.

6. The apparatus of claim 4, wherein the mask is stored in the entry in the second cache.

7. The apparatus of claim 1, wherein the second cache includes entries that store intermediate results associated with multiple different levels of the page table.

8. The apparatus of claim 1, wherein the first cache comprises a translation lookaside buffer that stores a subset consisting of fewer than all of the final mappings of the hierarchical page table.

9. The apparatus of claim 1, further comprising a physical memory interface configured to access a first portion of the physical memory storing data referenced by physical addresses of a physical address space, and a second portion storing at least one level of the hierarchical page table.

10. The apparatus of claim 9, further comprising a storage device storing data referenced by virtual addresses of a virtual address space.

11. The apparatus of claim 1, wherein a first subset of the entries in the second cache are associated with a first level of the multiple levels of the of the hierarchical page table, a second subset of the entries in the second cache are associated with a second level of the multiple levels of the hierarchical page table, and the comparison of a portion of the first virtual address to the entries in the first subset is performed in parallel to the comparison of a portion of the first virtual address to the entries in the second subset.

12. The apparatus of claim 1, wherein the comparison of a portion of the first virtual address to portions of entries in the second cache takes 3 processor cycles.

13. A method comprising:
    executing, in a core, memory instructions that access data stored in physical memory based on virtual addresses translated to physical addresses based on a hierarchical page table having multiple levels that each store different intermediate results for determining final mappings between virtual addresses and physical addresses; and
    managing, in a memory management unit (MMU) coupled to the core, a first cache that stores a plurality of the final mappings of the page table, a page table walker that traverses the levels of the page table to provide intermediate results associated with respective levels for determining the final mappings, and a second cache that stores a limited number of intermediate results provided by the page table walker;
    wherein the MMU compares a portion of the first virtual address to portions of entries in the second cache, in response to a request from the core to invalidate a first virtual address;
    wherein the comparison is based on a match criterion that depends on the level associated with each intermediate result stored in an entry in the second cache; and
    wherein the MMU removes any entries in the second cache that satisfy the match criterion.

14. The method of claim 13, wherein the portion of an entry in the second cache that is compared with the portion of the first virtual address is a consecutive sequence of bits of a virtual address associated with an intermediate result stored in the entry.

15. The method of claim 14, wherein the comparison is based on a match criterion that depends on the level associated with each intermediate result stored in an entry in the second cache, and depends on a granule size of a page containing the virtual address associated with the intermediate result.

16. The method of claim 14, wherein the comparison comprises applying a bit mask to the entry in the second cache to determine the portion of the entry in the second cache, and applying a bit mask to the first virtual address to determine the portion of the first virtual address.

17. The method of claim 16, wherein the mask is computed in response to the request from the core to invalidate a first virtual address.

18. The method of claim 16, wherein the mask is stored in the entry in the second cache.

19. The method of claim 13, wherein the second cache includes entries that store intermediate results associated with multiple different levels of the page table.

20. The method of claim 13, wherein the first cache comprises a translation lookaside buffer that stores a subset consisting of fewer than all of the final mappings of the hierarchical page table.

21. The method of claim 13, further comprising a physical memory interface configured to access a first portion of the physical memory storing data referenced by physical addresses of a physical address space, and a second portion storing at least one level of the hierarchical page table.

22. The method of claim 21, further comprising a storage device storing data referenced by virtual addresses of a virtual address space.

23. The method of claim 13, wherein a first subset of the entries in the second cache are associated with a first level of the multiple levels of the of the hierarchical page table, a second subset of the entries in the second cache are associated with a second level of the multiple levels of the hierarchical page table, and the comparison of a portion of the first virtual address to the entries in the first subset is performed in parallel to the comparison of a portion of the first virtual address to the entries in the second subset.

24. The method of claim 13, wherein the comparison of a portion of the first virtual address to portions of entries in the second cache takes 3 processor cycles.

* * * * *